(12) United States Patent
Wiesner et al.

(10) Patent No.: US 9,527,246 B2
(45) Date of Patent: Dec. 27, 2016

(54) OPTICAL IRRADIATION DEVICE FOR A SYSTEM FOR PRODUCING THREE-DIMENSIONAL WORK PIECES BY IRRADIATING POWDER LAYERS OF A POWDERED RAW MATERIAL USING LASER RADIATION

(71) Applicant: SLM Solutions GmbH, Luebeck (DE)

(72) Inventors: Andreas Wiesner, Luebeck-Krummesse (DE); Dieter Schwarze, Paderborn (DE); Henner Schoeneborn, Luebeck (DE)

(73) Assignee: SLM Solutions GmbH, Luebeck (DE)

( * ) Notice: Subject to any disclaimer, the term of this patent is extended or adjusted under 35 U.S.C. 154(b) by 646 days.

(21) Appl. No.: 13/684,601

(22) Filed: Nov. 26, 2012

(65) Prior Publication Data
US 2013/0134637 A1  May 30, 2013

(30) Foreign Application Priority Data
Nov. 24, 2011 (DE) .................. 10 2011 119 319

(51) Int. Cl.
*B29C 67/00* (2006.01)
*B23K 26/06* (2014.01)
(Continued)

(52) U.S. Cl.
CPC ......... *B29C 67/0077* (2013.01); *B23K 26/064* (2015.10); *B23K 26/067* (2013.01);
(Continued)

(58) Field of Classification Search
CPC ................................................ B29C 67/0077
See application file for complete search history.

(56) References Cited

U.S. PATENT DOCUMENTS

2001/0023861 A1* 9/2001 Karube et al. ........... 219/121.76
2003/0024906 A1  2/2003 Horsting et al.
(Continued)

FOREIGN PATENT DOCUMENTS

DE  102007061549 A1  7/2009
DE  102010003750 A1  10/2011
(Continued)

OTHER PUBLICATIONS

Zhu et al., "Coherent beam transformations using multi mode waveguides", Optics Express, 2010, vol. 18, No. 7, pp. 7506-7520.
(Continued)

*Primary Examiner* — Ryan Ochylski
(74) *Attorney, Agent, or Firm* — Carter, DeLuca, Farrell & Schmidt, LLP (57) ABSTRACT

An optical irradiation device is provided which includes a multimode optical fiber suitable for the central wavelength of a beam of light having a first beam profile which enters through an input connection for multimode guidance; a switching device, which can be switched between a first and second light conducting state and is configured to conduct the beam of light entering through the input connection in the first light conducting state to an output connection, such that the beam of light has the first beam profile on emerging from the output connection, and guides the beam of light entering the input connection to the output connection by the multimode optical fiber in the second light conducting state, so that the beam of light has a second beam profile different from the first beam profile on emerging from the output connection by the multimode guidance in the multimode optical fiber.

9 Claims, 4 Drawing Sheets

(51) Int. Cl.
*B23K 26/067* (2006.01)
*B22F 3/105* (2006.01)

(52) U.S. Cl.
CPC .. *B23K 26/0613* (2013.01); *B22F 2003/1056* (2013.01); *Y02P 10/295* (2015.11)

(56) References Cited

U.S. PATENT DOCUMENTS

2005/0152643 A1* 7/2005 Blauvelt .............. G02B 6/264
385/31
2009/0208170 A1 8/2009 Moriarty

FOREIGN PATENT DOCUMENTS

EP 1241745 A2 9/2002
EP 2335848 A1 6/2011

OTHER PUBLICATIONS

Mayeh et al, "Laser Beam Shaping and Mode Conversion in Optical Fibers", Photonic Sensors, 2011, vol. 1, No. 2, pp. 187-198.
Mayeh et al, "Laser Beam Shaping and Mode Conversion in Optical Fibers", Photonic Sensors, 2011, vol. 1, No. 2, pp. 187-198, springerlink.com.
Gu et al, "All-Fiber Laser Beam Shaping Using a Long-period Granting", Optical Society of America, 2007, pp. 1-9.
Fa, "Modifying Beam Profiles with Multimode Fibers", Thorlabs, 2015, pp. 1-10.

* cited by examiner

OPTICAL IRRADIATION DEVICE FOR A SYSTEM FOR PRODUCING THREE-DIMENSIONAL WORK PIECES BY IRRADIATING POWDER LAYERS OF A POWDERED RAW MATERIAL USING LASER RADIATION

TECHNICAL FIELD

The present invention relates to an optical irradiation device, which is provided for a system for producing three-dimensional work pieces by irradiation of powder layers of a powdered raw material using laser radiation. Furthermore, the invention relates to a method for operating such an optical irradiation device and a system for producing three-dimensional work pieces by irradiating powder layers of a powdered raw material using laser radiation.

BACKGROUND

Selective laser melting (SLM) or selective laser sintering (SLS) is a generative layer buildup method for processing powdered, in particular metallic and/or ceramic raw materials to form three-dimensional work pieces with complex shapes. To do so, a powdered raw material layer is applied to a carrier and exposed to laser radiation in the selective locations, depending on the desired geometry of the work piece to be created. The laser radiation penetrating into the powder layer causes heating and consequently melting or sintering of the powdered raw material particles. Then additional powdered raw material layers are applied successively to the layer that has already been laser-treated and the layer is irradiated again until the work piece has the desired shape and size. Selective laser melting or laser sintering may be used in particular for producing prototypes, tools, spare parts or medical prostheses, for example, dental or orthopedic prostheses by means of CAD data.

An SLM/SLS strategy consists of virtually dividing the work piece to be produced into a shell region and a core region. In producing the work piece, the shell region is then irradiated first with a beam of light having a comparatively narrow and/or Gaussian beam profile, whereas then the core region is subsequently irradiated with a beam of light having a comparatively broad and/or homogeneous beam profile. At least two different beam profiles are thus necessary for this so-called core-shell strategy.

SUMMARY

An object of the present invention is to provide an optical irradiation device for a system for producing work pieces by irradiating powder layers of a powdered raw material using laser radiation, a method for operating such an optical irradiation device and a system for producing work pieces by irradiating powder layers of a powdered raw material using laser radiation, with the help of which work pieces can be produced more efficiently.

The object defined above is achieved by an optical irradiation device, a method for operating an optical irradiation device and a system.

The present invention is based on the following finding regarding the propagation of light in an optical fiber, among other things.

An optical fiber is understood to be a waveguide for electromagnetic waves. The light to be conducted in the optical fiber may be guided in the optical fiber by means of either monomode guidance in the basic mode or multimode guidance in the basic mode and additionally in one or more higher modes. The basic mode may degenerate twice, for example, in a cylindrically symmetrical optical fiber according to the two degrees of freedom of polarization of an electromagnetic wave. In the latter case, we nevertheless speak of monomode guidance here.

Whether a beam of light is guided in an optical fiber by means of monomode guidance or by means of the multimode guidance depends on physical parameters of the beam of light and physical parameters of the optical fiber.

For guidance of a beam of light within a cylindrical optical fiber, the wavelength λ of the beam of light and the cutoff wavelength $\lambda_{CO}$ of the optical fiber are relevant, for example: monomode guidance of the beam of light is possible only if the wavelength λ of the beam of light is longer than the cutoff wavelength $\lambda_{CO}$ of the optical fiber or is the same length as the cutoff wavelength $\lambda_{CO}$ of the optical fiber, i.e., $\lambda \geq \lambda_{CO}$. If the wavelength λ of the beam of light is shorter than the cutoff wavelength $\lambda_{CO}$ of the optical fiber, i.e., if $\lambda < \lambda_{CO}$, then multimode guidance may occur. Whether an optical fiber is a monomode optical fiber or a multimode optical fiber thus depends on the cutoff wavelength $\lambda_{CO}$ of the optical fiber and the wavelength λ of the beam of light to be guided. If the cutoff wavelength $\lambda_{CO}$ of the wavelength fiber and/or the wavelength λ of the beam of light to be guided are unknown, then it is impossible to make a statement by means of how many modes the beam of light is guided in.

For example, the cutoff wavelength $\lambda_{CO}$ of the optical fiber is calculated as follows for a cylindrical optical fiber having a (fiber) core with a core diameter d and a refractive index $n_K$ as well as a cladding surrounding the core with a refractive index $n_M$:

$$\lambda_{CO} = \frac{\pi d NA}{2} \cdot 405,$$

where NA is the numeric aperture of the optical fiber and $$NA = \sqrt{n_K^2 - n_M^2}.$$

The lateral intensity distribution of the mode field representing a beam of light in its emergence from one end of the fiber of a multimode optical fiber in particular depends on how many and which modes the beam of light is in for guidance in the multimode optical fiber. However, which modes and how many are used to guide the beam of light in the multimode optical fiber depend in particular on how the beam of light is coupled into the multimode optical fiber. This means that almost any beam profile of the beam of light emerging from the multimode optical fiber can be generated by carefully feeding the beam of light into the multimode optical fiber.

Thus, for example, a beam of light having a Gaussian beam profile may be input into a multimode optical fiber in such a way that the beam of light essentially completely illuminates the fiber core of the multimode optical fiber in its reemergence from the multimode optical fiber and has a homogenized or almost homogeneous beam profile over at least a subsection of the cross section of the fiber core.

Conversely, this means that to generate a desired beam profile, in particular a homogenized or homogeneous beam profile of a beam of light emerging from an optical fiber, the optical fiber must also in fact be configured as a multimode optical fiber for the corresponding beam of light.

With the help of a multimode optical fiber, it is thus possible to manipulate the beam profile of a beam of light in a targeted manner. By selectively guiding a beam of light through a multimode optical fiber in particular, it is possible to switch between a first beam profile and a second beam profile that is different from the first beam profile.

An optical irradiation device according to the invention for a system for producing work pieces by irradiation of powder layers of a powdered raw material using laser radiation comprises a multimode optical fiber, which is suitable for multimode guidance for the central wavelength λ of a beam of light which has a first beam profile and enters through an input connection. The optical irradiation device also comprises a switching device, which is switchable selectively between a first light conducting state and a second light conducting state. This switching device is configured for conducting the beam of light entering through the input connection to an output connection, so that in the first light conducting state, the beam of light has a first beam profile on emerging from the output connection, and so that in the second light conducting state, it conducts the beam of light entering through the input connection to the output connection by means of the multimode optical fiber, such that the beam of light has a second beam profile that is different from the first beam profile on emerging from the output connection by means of the multimode guidance in the multimode optical fiber.

The optical irradiation device according to the invention thus makes it possible to switch between a first beam profile and a second beam profile that is different from the beam profile and to do so by selective redirection of a beam of light through a multimode optical fiber. This allows switching between two different beam profiles in particular, such as that required for a core-shell strategy. For example, if the first beam profile is a comparatively narrow and/or Gaussian beam profile and the second beam profile is a comparatively broad and/or homogeneous beam profile, then with the help of the present invention, the shell area may be irradiated first with the first beam profile in producing a work piece, and following that, the core area may be irradiated with the second beam profile by switching from the first light conducting state to the second light conducting state between the two buildup sections. On the whole, the present invention thus allows efficient production of work pieces.

Another advantage of the present invention is that a single beam of light can be guided over two different beam paths by selective switching according to the invention. Due to this principle of deflection or redirection, it is not necessary to switch back and forth between two beams of light to supply two different beam profiles, each beam of light having to be "parked" in a beam dump when not in use. This permits efficient utilization of available light output.

The first beam profile may be a Gaussian beam profile. The second beam profile may be a leveled, homogenized, uniform, almost uniform, homogeneous, almost homogeneous, top-hat-shaped and/or almost top-hat-shaped beam profile. The characteristic width of the first beam profile in the lateral intensity distribution of the first beam profile may be narrower than the characteristic width of the second beam profile in the lateral intensity distribution of the second beam profile.

The multimode (MM) optical fiber may be configured as a cylindrical multimode optical fiber, a cylindrically symmetrical multimode optical fiber, a step index multimode optical fiber, a gradient index multimode optical fiber and/or a photonic crystal multimode optical fiber. A step index multimode optical fiber is a cylindrically symmetrical multimode optical fiber, which has a (fiber) core with a core diameter $d_{MM}$ and a refractive index $n_{K,MM}$ and also has a cladding having a refractive index $n_{M,MM}$ sheathing the core. It preferably holds that $n_{K,MM} > n_{M,MM}$. The multimode optical fiber may additionally be sheathed by further shells or layers, such as a protective coating and/or an outer protective jacket. The multimode optical fiber may be configured as a polarization maintaining (PM) multimode optical fiber. The core diameter $d_{MM}$ is preferably 100 μm. The multimode optical fiber may be characterized by a cutoff wavelength $\lambda_{CO,MM}$, which is required for the monomode guidance.

The input connection and/or the output connection may each be configured as a tube arranged concentrically with the beam axis of the beam of light passing through the input connection and/or the output connection. The tube may have an outside diameter of 40 mm and/or an inside diameter adapted for a loss-free passage of the beam of light passing through the input connection and/or the output connection, so that the beam profile of the beam of light is not impaired by the input connection and/or the output connection. A tube is preferably configured so that an additional component of the optical irradiation device such as an optical component, for example, as described further below and/or an input collimator as described further below can be connected to it.

The switching device preferably comprises a first light deflecting unit, which is configured to deflect the beam of light having the first beam profile and entering through the input connection to a first fiber end of the multimode optical fiber in the second light conducting state of the switching device, such that the beam of light has the second beam profile on emerging from a second fiber end of the multimode optical fiber. The first light deflecting unit is preferably configured to deflect the beam of light entering through the input connection in the second light conducting state to the first fiber end of the multimode optical fiber, such that the beam of light illuminates at least a section of the (fiber) core of the multimode optical fiber uniformly, almost uniformly, homogeneously and/or almost homogeneously in its emergence from the second fiber end of the multimode optical fiber. In doing so, the mode field representing the beam of light in its emergence from the second fiber end of the multimode optical fiber may have a leveled, homogenized, uniform, almost uniform, homogeneous and/or almost homogeneous lateral intensity distribution over at least a section of the outlet surface of the (fiber) core of the multimode optical fiber.

The switching device preferably also has a second light deflecting unit, which is configured to deflect the beam of light having the second beam profile on emerging from the second fiber end of the multimode optical fiber to the output connection in the second light conducting state of the switching device. The second light deflecting unit may also be configured to deflect the beam of light emerging from the second fiber end of the multimode optical fiber in the second light conducting state to the output connection in such a way that it runs coaxially with the beam of light entering through the input connection.

The first light deflecting unit of the switching device may comprise a first light deflecting mirror, which can be moved into or out of the beam path of the beam of light entering through the input connection. The first light deflecting mirror may be configured to output and/or deflect the beam of light entering through the input connection out of its original beam path. The first light deflecting mirror in particular may be configured to deflect the beam of light entering through the input connection preferably by approximately 90°. Furthermore, the first light deflecting unit may comprise a first light deflecting collimator. The first light deflecting collimator may be configured to deflect and/or focus the beam of light deflected by means of the first light deflecting mirror to the first fiber end of the multimode optical fiber in the second light conducting state.

The second light deflecting unit of the switching device may comprise a second light deflecting collimator. The second light deflecting collimator may be configured to bundle and/or collimate the beam of light emerging from the second fiber end of the multimode optical fiber in the second light conducting state. The second light deflecting unit may also comprise a second light deflecting mirror, which can be moved into or out of the beam path of the beam of light entering through the input connection. The second light deflecting mirror may be configured to deflect the beam of light emerging from the second fiber end of the multimode optical fiber through the output connection in such a way that it runs coaxially with the beam of light entering through the input connection. The second light deflecting mirror may be configured to deflect the beam of light emerging from the second fiber end of the multimode optical fiber, preferably by approx. 90°.

The optical irradiation device may comprise an input collimator. The input collimator may be connected to an optical fiber, in particular to a monomode optical fiber. The input collimator may be configured to collimate a beam of light emerging from an optical fiber connected to the input collimator and/or to guide the beam of light through the input connection.

Furthermore, the optical irradiation device may comprise a monomode (or also single-mode, abbreviated SM) optical fiber suitable for the central wavelength $\lambda$ of a beam of light for monomode guidance. The monomode optical fiber may serve as a laser-active medium of a laser configured as a fiber laser. The monomode optical fiber may be connected to the input collimator at one fiber end.

The monomode optical fiber may be configured as a cylindrical monomode optical fiber, a cylindrically symmetrical monomode optical fiber, a step index monomode optical fiber, a gradient index monomode optical fiber and/or a photonic crystal monomode optical fiber. A step index monomode optical fiber is a cylindrically symmetric monomode optical fiber, which has a (fiber) core with a core diameter $d_{SM}$ and a refractive index $n_{K,SM}$, as well as a cladding, which sheaths the core and has a refractive index $n_{M,SM}$. It preferably holds that $n_{K,SM} > n_{M,SM}$. The monomode optical fiber may also be sheathed by additional sheathings or layers such as a protective coating and/or an outer protective sleeve (jacket). The monomode optical fiber may also be configured as a polarization maintaining (PM) monomode optical fiber. The core diameter $d_{SM}$ is preferably 20 µm. The monomode optical fiber can be characterized by a cutoff wavelength $\lambda_{CO,SM}$ which is required for the monomode guidance.

The optical irradiation device may also comprise a laser for creating a beam of light having a central wavelength $\lambda$. This laser generates a beam of light, preferably having a narrow-band spectrum with a central wavelength $\lambda$. The central wavelength $\lambda$ may be understood to be the median of the spectrum. The central wavelength $\lambda$ may be between 1000 nm and 1100 nm, preferably between 1050 nm and 1075 nm, especially preferably 1064 nm. The central wavelength $\lambda$ preferably undergoes a high absorption in a powdered raw material that is to be processed. The output power of the laser 12 is preferably 1 kW in continuous wave (CW) operation. However, the output power of the laser may also be adjustable. The laser may be configured as a fiber laser.

The laser may be configured to generate the beam of light with a central wavelength $\lambda$ which is longer than the cutoff wavelength $\lambda_{CO,SM}$ of the monomode optical fiber necessary for monomode guidance and is shorter than the cutoff wavelength $\lambda_{CO,MM}$ of the multimode optical fiber necessary for the monomode guidance.

The laser and the monomode optical fiber may be connected to one another and adjusted in such a way that a beam of light described only by the basic mode of the monomode optical fiber emerges at a fiber end of the monomode optical fiber facing away from the laser.

The monomode optical fiber, one fiber end of the monomode optical fiber, the input collimator, the first light deflecting unit, the first light deflecting mirror, the first light deflecting collimator, the multimode optical fiber and/or the first fiber end of the multimode optical fiber may be arranged, positioned and/or oriented in relation to one another in the second light conducting state, such that the beam of light has the second beam profile on emerging from the second fiber end of the multimode optical fiber. The monomode optical fiber, the fiber end of the monomode optical fiber, the input collimator, the first light deflecting unit, the first light deflecting mirror, the first light deflecting collimator, the multimode optical fiber and/or the first fiber end of the multimode optical fiber in the second light conducting state may preferably be arranged, positioned and/or oriented in relation to one another such that the beam of light illuminates at least one section of the (fiber) core of the multimode optical fiber uniformly, almost uniformly, homogeneous and/or almost homogeneously on emerging from the second fiber end of the multimode optical fiber. The mode field representing the beam of light on emergence from the second fiber end of the multimode optical fiber may have a leveled, homogenized, uniform, almost uniform, homogeneous and/or almost homogenous lateral intensity distribution over at least a section of the outlet area of the (fiber) core of the multimode optical fiber.

The optical irradiation device may also comprise optical components which are configured to focus the beam of light emerging from the output connection on a focus and/or to guide the focus three-dimensionally in space.

In particular the optical components may be configured to focus the beam of light emerging from the output connection on any point within a scan field. The optical components are preferably configured to focus the beam of light emerging from the output connection at any point within a planar, i.e., an uncurved scan field. The control of the focus may be accomplished through the optical components in such a way that an f-theta lens for focusing the beam of light may be omitted. The optical component may also be configured to widen the beam of light emerging from the output connection. The widening factor amounts to 1.68, for example.

The input collimator and the optical components may be configured and arranged in the first light conducting state so that the fiber end of the monomode optical fiber and/or the beam profile of the beam of light emerging from the monomode optical fiber is/are sharply imaged on the scan field. The second light deflecting collimator, the second light deflecting mirror and the optical components may be configured and arranged in the second light conducting state so that the fiber end of the multimode optical fiber and/or the beam profile of the beam of light emerging from the multimode optical fiber is/are sharply imaged on the scan field.

In a method according to the invention for operating an optical irradiation device for a system for producing work pieces by irradiation of powder layers of a powdered raw material with laser radiation, a beam of light having a central wavelength $\lambda$ and a first beam profile is guided through an input connection. Furthermore, a multimode optical fiber suitable for the central wavelength λ of the beam of light emerging through the input connection and suitable for multimode guidance is provided. Furthermore, by means of a switching device, it is possible to switch selectively between a first light conducting state and a second light conducting state. In doing so the beam of light entering through the input connection in the first light conducting state is directed to an output connection in such a way that the beam of light has the first beam profile on emerging from the output connection. However, the beam of light entering through the input connection in the second light conducting state is sent to the output connection by means of the multimode optical fiber, so that the beam of light has a second beam profile that is different from the first beam profile and does so by means of the multimode guidance in the multimode optical fiber on emerging from the output connection.

In this method, in the second light conducting state of the beam of light having the first beam profile and entering through the input connection, the beam of light is preferably deflected onto a first fiber end of the multimode optical fiber, such that the beam of light has the second beam profile on emerging from a second fiber end of the multimode optical fiber. In the second light conducting state, the beam of light entering through the input connection is preferably deflected onto the first fiber end of the multimode optical fiber such that the beam of light illuminates at least one section of the (fiber) core of the multimode optical fiber uniformly, almost uniformly, homogeneously and/or almost homogeneously on emerging from the second fiber end of the multimode optical fiber. The mode field representing the beam of light on emerging from the second fiber end of the multimode optical fiber may have a leveled, homogenized, uniform, almost uniform, homogeneous and/or almost homogeneous lateral intensity distribution over at least a section of the output surface of the (fiber) core of the multimode optical fiber.

In this method, the beam of light having the second beam profile on emerging from the second fiber end of the multimode optical fiber in the second light conducting state is preferably deflected to the output connection. In the second light conducting state in particular, the beam of light emerging from the second fiber end of the multimode optical fiber is deflected to the output connection in such a way that it runs coaxially with the beam of light entering through the input connection.

In this method, a first light deflecting mirror is preferably moved into or out of the beam path of the beam of light entering through the input connection between the first and second light conducting states. The beam of light entering through the input connection may be output and/or deflected out of its original beam path by means of the first light deflecting mirror. In particular the beam of light entering through the input connection may preferably be deflected by approx. 90° by means of the first light deflecting mirror. Furthermore, in the second light conducting state, the beam of light deflected by means of the first light deflecting mirror may be deflected and/or focused on the first fiber end of the multimode optical fiber with the help of a first light deflecting collimator.

In this method, the beam of light emerging from the second fiber end of the multimode optical fiber in the second light conducting state is preferably bundled and/or collimated by means of a second light deflecting collimator. In this method, a second light deflecting mirror is preferably moved into or out of the beam path of the beam of light entering through the input connection between the first and second light conducting states. In particular the beam of light emerging from the second fiber end of the multimode optical fiber is deflected by means of a second light deflecting mirror through the output connection in such a way that it runs coaxially with the beam of light entering through the input connection. The beam of light emerging from the second fiber end of the multimode optical fiber may be deflected by means of the light reflecting mirror preferably by approx. 90°.

In this method, a beam of light is preferably collimated by means of an input collimator and/or guided through the input connection. Furthermore, in this method, a monomode optical fiber suitable for a central wavelength λ of the beam of light for the monomode guidance is provided.

In this method, a beam of light having a central wavelength λ is preferably generated by means of a laser. In particular the beam of light generated can be guided by means of a monomode optical fiber suitable for the central wavelength λ of the beam of light generated for the monomode guidance, such that the beam of light has a first beam profile by means of the monomode guidance in the monomode optical fiber on emerging from the monomode optical fiber. The beam of light emerging from the monomode optical fiber is preferably collimated by means of the input collimator and/or the collimated beam of light is guided through the input connection.

The beam of light may be generated in particular by means of the laser with a central wavelength λ, which is longer than the cutoff wavelength $\lambda_{CO,SM}$ of the monomode optical fiber required for the monomode guidance and is shorter than the cutoff wavelength $\lambda_{CO,MM}$ of the multimode optical fiber required for monomode guidance. In this method the monomode optical fiber, a fiber end of the monomode optical fiber, the input collimator, the first light deflecting unit, the first unit deflecting mirror, the first light deflecting collimator, the multimode optical fiber and/or the first fiber end of the multimode optical fiber are preferably arranged, positioned and/or oriented with respect to one another in the second light conducting state, such that the beam of light has the second beam profile on emerging from the second fiber end of the multimode optical fiber. In particular the monomode optical fiber, the fiber end of the monomode optical fiber, the input collimator, the first light deflecting unit, the first light deflecting mirror, the first light deflecting collimator, the multimode optical fiber and/or the first fiber end of the multimode optical fiber in the second optical fiber state are arranged, positioned and/or oriented with respect to one another so that the beam of light illuminates at least a section of the (fiber) core of the multimode optical fiber uniformly, almost uniformly, homogeneously and/or almost homogeneously on emerging from the second fiber end of the multimode optical fiber. The mode field representing the beam of light on emerging from the second fiber end of the multimode optical fiber may have a leveled, homogenized, uniform, almost uniform, homogeneous and/or almost homogeneous lateral intensity distribution over at least a section of the outlet surface of the (fiber) core of the multimode optical fiber.

In this method, the beam of light emerging from the output end is preferably focused on a focus by means of optical components, and the focus is guided three-dimensionally in space by means of the optical components.

A system according to the invention for producing work pieces by irradiation of powder layers of a powdered raw material using laser radiation comprises a carrier to which powder layers of the powdered raw material can be applied and an optical irradiation device as described above. The optical irradiation device is configured and arranged to irradiate a powder layer applied to the carrier with the beam of light in order to produce a three-dimensional work piece from the powdered raw material by a generative layer buildup method.

Inasmuch as a method and/or individual steps of a method for operating an optical irradiation device for a system for producing work pieces by irradiation of powder layers of a powdered raw material using laser radiation is/are described in this description, the method and/or individual steps of the method may be performed by a suitably designed optical irradiation device. The situation is similar for the explanation of the operation of an optical irradiation device which performs the process steps. To this extent, the device features and process features of this description are equivalent/ interchangeable.

BRIEF DESCRIPTION OF THE DRAWINGS

This invention is explained in greater detail below by means of the accompanying drawings, in which.

DETAILED DESCRIPTION

Figure 1A:
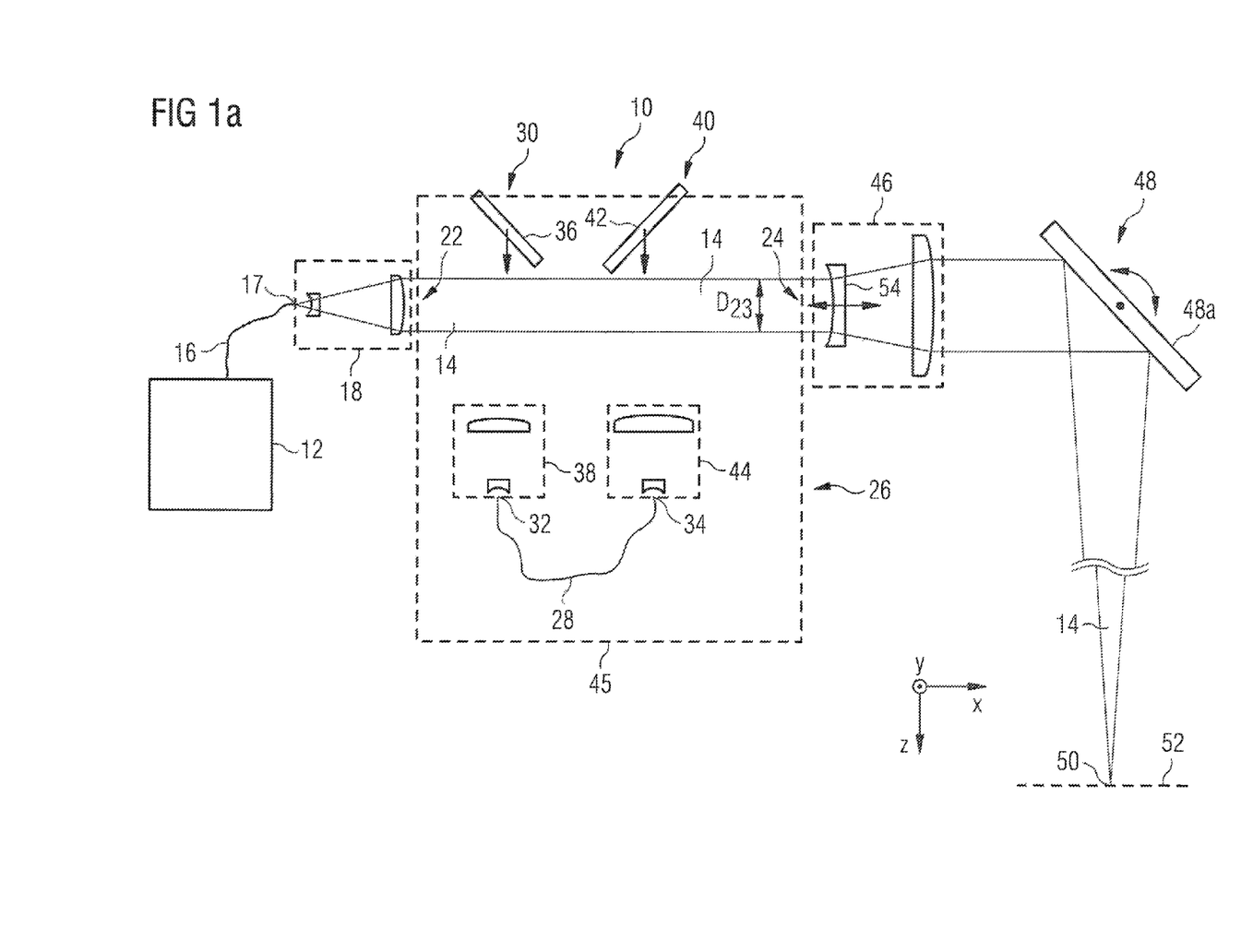
FIG. 1a shows a schematic overview diagram of an optical irradiation device according to an exemplary embodiment in which a switching device is in a first light conducting state.
Figure 1B:
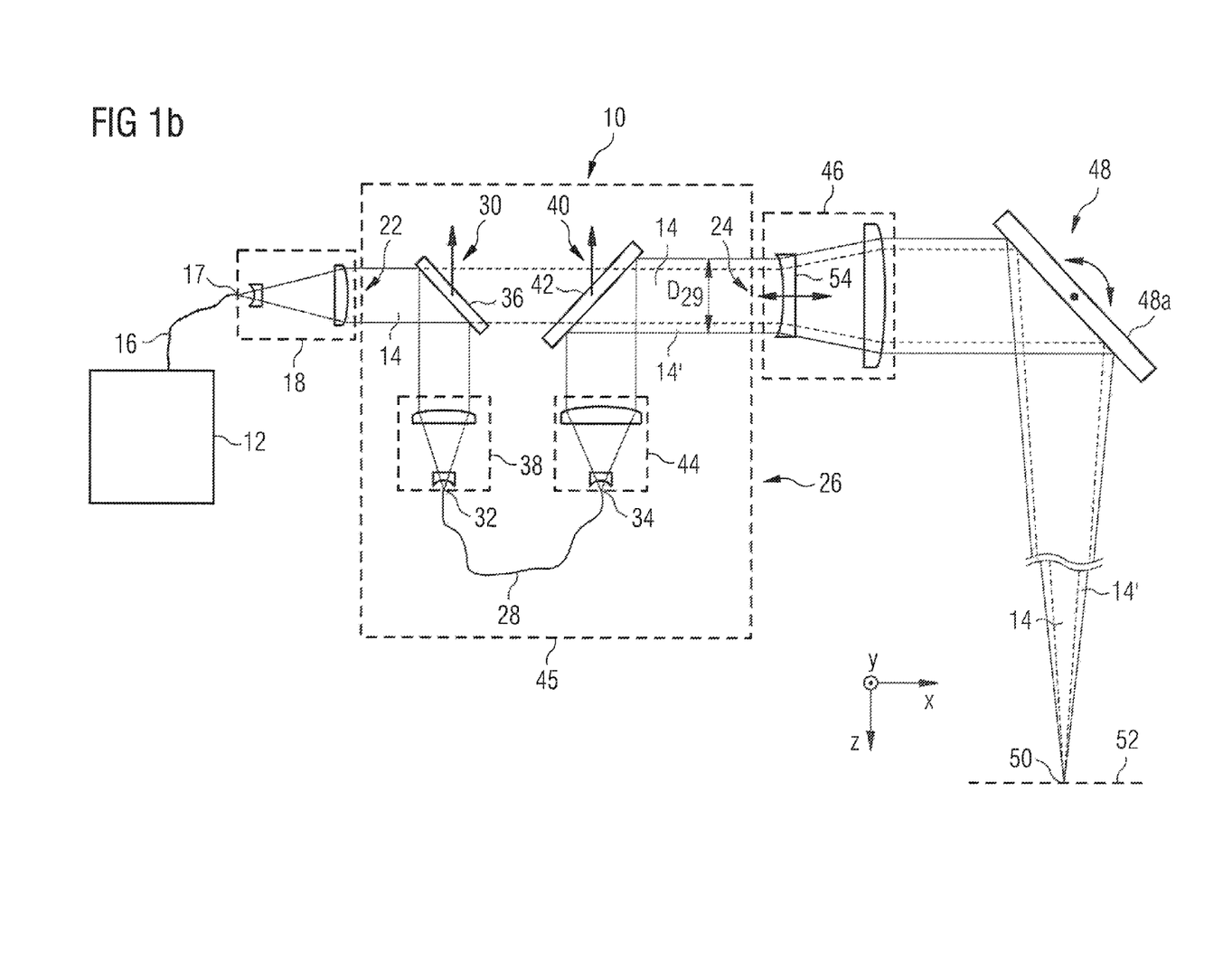
FIG. 1b shows a schematic overview diagram of the optical irradiation device from FIG. 1a in which the switching device is in a second light conducting state.
Figure 3:
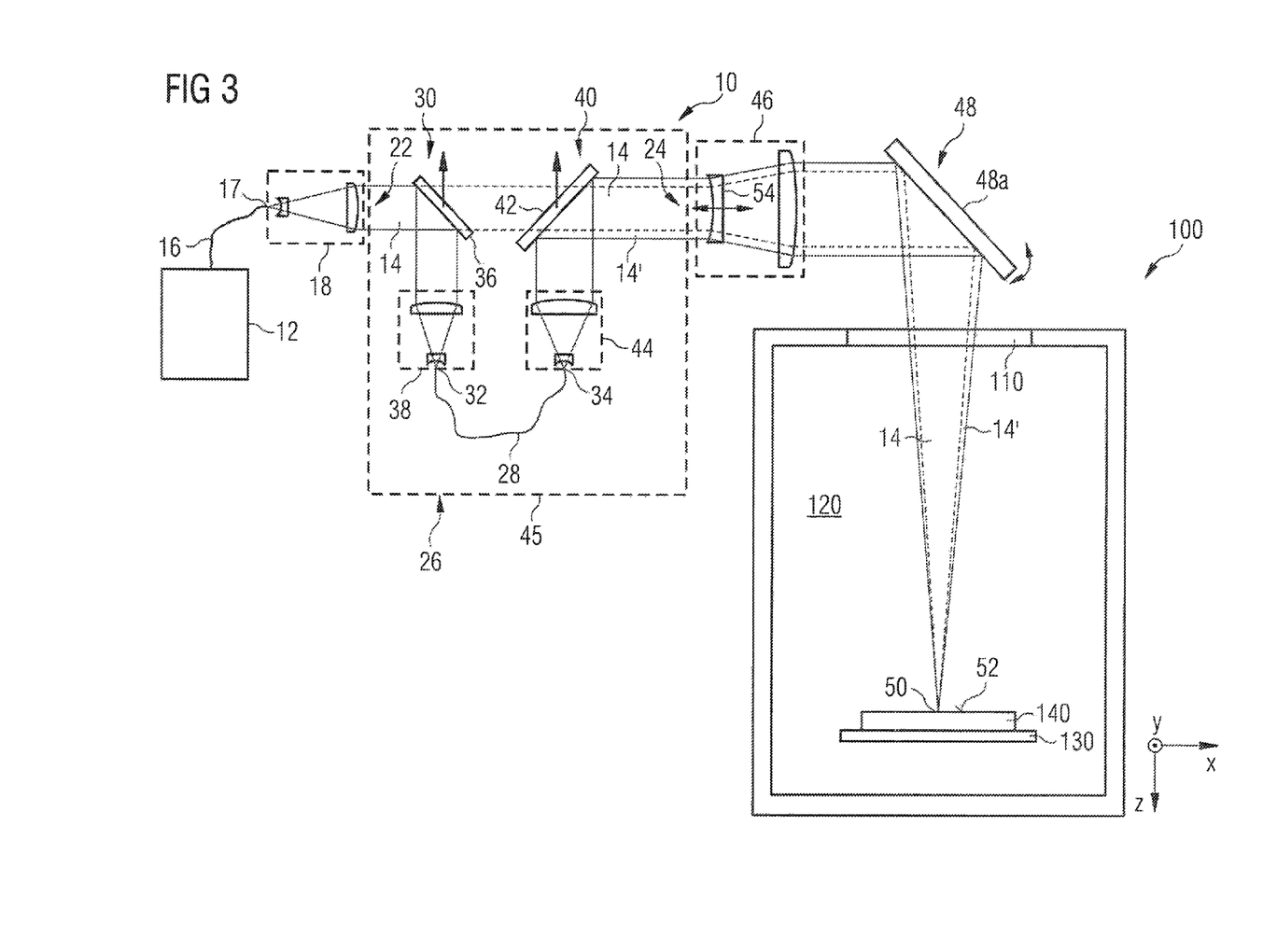
FIG. 3 shows a schematic overview diagram of a system for producing work pieces by irradiation of powder layers of a powdered raw material using laser radiation.

In FIGS. 1a, 1b and 3 an optical irradiation device is labeled as 10 in general. The optical irradiation device 10 may be used in a system 100 for producing work pieces by irradiation of powder coatings of a powdered raw material using laser radiation, as shown in FIG. 3, for example.

The optical irradiation device 10 comprises a laser 12. The laser 12 generates a beam of light 14 having a narrow-band spectrum with a central wavelength $\lambda$. The central wavelength $\lambda$ is in the range of 1 μm, for example, approx. 1064 nm. The central wavelength $\lambda$ undergoes a high absorption in the powdered raw material to be processed. The output power of the laser 12 is 1 kW, for example, in continuous wave (CW) operation.

The beam of light 14 is guided within a monomode optical fiber 16. For example, the laser 12 may be configured as a fiber laser. In this case the monomode optical fiber 16 may serve as a laser-active medium of the laser 12. The monomode optical fiber 16 is, for example, a cylindrically symmetrical optical fiber comprising a fiber core with a core diameter $d_{SM}$ of 20 μm and a cladding which sheaths the fiber core. The cutoff wavelength $\lambda_{CO,SM}$ of the monomode optical fiber 16 and the central wavelength $\lambda$ of the beam of light 14 are adapted to one another, so that the beam of light 14 is guided within the monomode optical fiber 16 by means of monomode guidance.

The beam of light 14 emerges from the fiber end 17 of the monomode optical fiber 16 facing away from the laser 12 as a monomode (single mode; abbreviated SM) beam of light 14. In other words, on emergence of the beam of light 14 from the monomode optical fiber 16, the beam of light 14 is described only by the basic mode, for example, the $TEM_{00}$ mode and has a Gaussian beam profile 20 in good approximation.

Figures 2A, 2C:
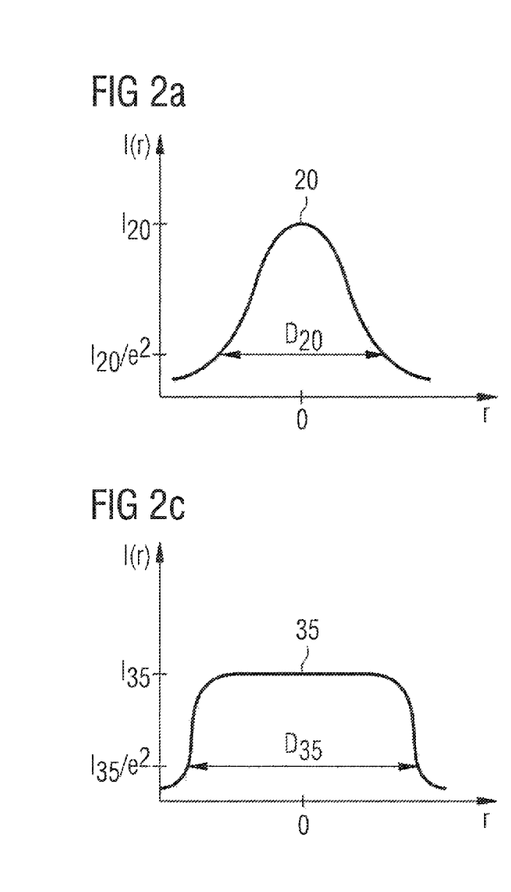
FIG. 2a shows a schematic diagram of a beam profile of a beam of light emerging from a monomode optical fiber.
FIG. 2c shows a schematic diagram of a beam profile of a beam of light emerging from a multimode optical fiber.

The Gaussian beam profile 20 is shown in FIG. 2a, where the lateral intensity distribution curve I(r) of the beam of light 14 has a bell-shaped distribution as a function of the lateral distance r from the beam center r=0. The width $D_{20}$ of the distribution I(r) within which the intensity I(r) of the beam profile 20 is greater than or equal to $1/e^2=13.5\%$ of the maximum intensity $I_{20}$ amounts to 16 μm, for example, as a function of the core diameter $d_{SM}$ of 20 μm.

An input collimator 18 is assigned to the optical irradiation device 10. For example, the input collimator 18 has a focal distance $f_{EK}$ of 50 mm. The fiber end 17 is arranged at the focal point and/or in the focal plane of the input collimator 18. The input collimator 18 collects the beam of light 14 emerging from the monomode optical fiber 16, collimates the beam of light 14 into an essentially collimated beam of light 14 (i.e., with negligible residual divergence of the beam of light 14 after emerging from the input collimator 18) and guides the collimated beam of light 14 through an input connection 22. The beam profile 23 of the beam of light 14 passing through the input connection 22 remains Gaussian due to the collimation of the beam of light 14, but the beam diameter $D_{23}$ of the collimated beam of light 14, within which the intensity I(r) of the beam profile 23 of the collimated beam of light 14 is greater than or equal to $1/e^2$ of the maximum intensity $I_{23}$, is now approx. 6.3 mm (see FIGS. 1a and 2b).

In the beam path of the beam of light 14 entering through the input connection 22, an output connection 24 is connected downstream from the input connection 22. The input connection 22 is configured as a cylindrically symmetrical tube. The input collimator 18 may be flange-connected to the input connection 22, such that the optical axis of the input collimator 18 runs coaxially with the axis of symmetry of the input connection 22. Furthermore, the optical irradiation device 10 comprises a switching device 26, which is selectively switchable between a first light conducting state and a second light conducting state. FIG. 1a shows the first light conducting state, and FIG. 1b shows the second light conducting state.

Figure 2B:
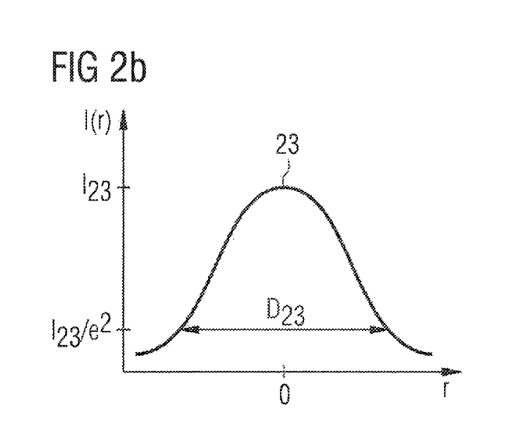
FIG. 2b shows a schematic diagram of a beam profile of a beam of light entering through an input connection.

The switching device 26 is configured to conduct the beam of light 14 having the Gaussian profile 23 entering through the input connection 22 in the first light conducting state to the output connection 24 in such a way that the beam of light 14 has almost the same Gaussian beam profile 23 on emerging from the output connection 24 as when the beam of light 14 enters through the input connection 22 (see FIG. 2b). In other words, in the first light conducting state, the collimated beam of light 14 is passed through and/or forwarded from the input connection 22 to the output connection 24 with no change and without deflection. To this end, the input collimator 18, the input connection 22 and the output connection 24 are arranged in relation to one another, so that the beam of light 14 entering through the input connection 22 is collimated from the output connection 24 in the first light conducting state on emerging with an unchanged beam profile 23 and beam diameter $D_{23}$.

Figure 2D:
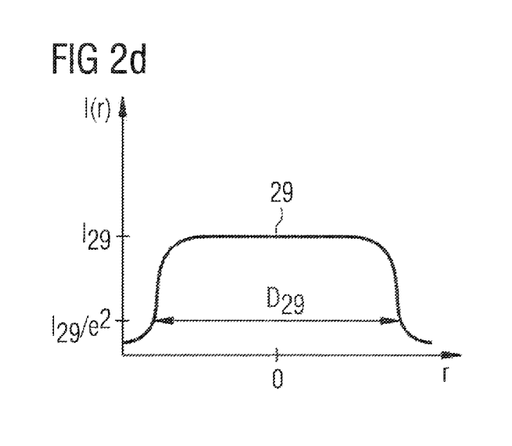
FIG. 2d shows a schematic diagram of a beam profile of a beam of light emerging through an output connection.

The switching device 26 is also configured to conduct the beam of light 14 entering through the input connection 22 and having a Gaussian beam profile 23 to the output connection 24 by means of a multimode optical fiber 28 in the second light conducting state, such that the beam of light 14', on emerging from the output connection 24, has a beam profile 29 that is different from the Gaussian beam profile 23 of the beam of light 14 entering through the input connection 22 (see FIG. 2d) because of the multimode guidance in the multimode optical fiber 28.

The multimode optical fiber 28 is, for example, a cylindrically symmetrical optical fiber having a fiber core with a core diameter $d_{MM}$ of 100 μm and a cladding which sheathes the fiber core. The cutoff wavelength $\lambda_{CO,MM}$ of the multimode optical fiber 28 and the central wavelength λ of the beam of light 14 are coordinated, so that the beam of light 14 can be or is guided within the multimode optical fiber 28 by means of multimode guidance.

To generate the beam profile 29 which is different from the beam profile 23, the switching device 26 has a first light deflecting unit 30 which is configured to deflect the beam of light 14 entering through the input connection 22 in the second light conducting state to a first fiber end 32 of the multimode optical fiber 28 such that the beam of light 14' has a desired non-Gaussian beam profile 35 on emerging from a second fiber end 34 of the multimode optical fiber 28.

To do so, the first light deflecting unit 30 comprises a first light deflecting mirror 36 which can be moved into or out of the beam path of the beam of light 14 entering through the input connection 22 and also comprises a first light deflecting collimator 38 which is configured to focus the beam of light 14 deflected by means of the first light deflecting mirror 36 in the second light conducting state onto the first fiber end 32 of the multimode optical fiber 28.

The first light deflecting mirror 36 comprises a planar mirror surface which is highly reflective for the wavelength λ of the beam of light 14 and is introduced into the beam path of the beam of light 14 in the second light conducting state in such a way that the surface normal of the first light deflecting mirror 36 forms an angle of approx. 45° with the beam path of the beam of light 14. The beam of light 14 is therefore deflected by approx. 90° but it remains collimated during this process. The beam of light 14 then enters into the first light deflecting collimator 38 where it is bundled. The first light deflecting collimator 38 couples the beam of light 14 through the first fiber end 32 into the multimode optical fiber 28. The first light deflecting collimator 38 has a focal distance $f_{LK1}$ of 60 mm.

The monomode optical fiber 16, the fiber end 17 of the monomode optical fiber 16, the input collimator 18, the first light deflecting unit 30, the first light deflecting mirror 36, the first light deflecting collimator 38, the multimode optical fiber 28 and/or the first fiber end 32 of the multimode optical fiber 28 are arranged in relation to one another such that the beam of light 14' on emerging from the multimode optical fiber 28 has the desired non-Gaussian beam profile 35.

The system here comprised of the input collimator 18 and the first light deflecting unit 30 or the first light deflecting mirror 36 and the first light deflecting collimator 38 images the fiber end 17 of the monomode optical fiber 16 on the first fiber end 32 of the multimode optical fiber 28. In doing so, the optical axis of the first light deflecting collimator 38 intersects the first fiber end 32 eccentrically (i.e., non-centrally and/or non-axially). In other words, the optical axis of the first light deflecting collimator 38 intersects the first fiber end 32 at a point having a distance different from zero from the center of the fiber core of the multimode optical fiber 28 at the first fiber end 32. Additionally or alternatively, the optical axis of the first light deflecting collimator 38 strikes the first fiber end 32 oblique (i.e., neither coaxially nor in parallel) with the axis of symmetry of the cylindrically symmetrical fiber core of the multimode optical fiber 28. In other words, the optical axis of the first light deflecting collimator 38 forms an angle $\theta_1$ with the axis of symmetry of the cylindrically symmetrical fiber core of the multimode optical fiber 28 on entering into the first fiber end 32, where modulo [$\theta_1$, 180°]≠0°.

This situation can be formulated as follows by means of the beam path and/or the beam course of the beam of light 14: The beam of light 14 strikes the first fiber end 32 eccentrically (i.e., non-centrally and/or non-axially) in the second light deflecting state. The beam of light 14 thus intersects the first fiber end 32 at a point of intersection such that the center of the point of intersection has a distance different from zero from the center of the fiber core of the multimode optical fiber 28 at the first fiber end 32. Additionally or alternatively, the main beam of the beam of light 14 may strike the first fiber end 32 obliquely (i.e., neither coaxially nor in parallel) to the axis of symmetry of the cylindrically symmetrical fiber core of the multimode optical fiber 28. The main beam of the beam of light 14 thus preferably forms an angle $\theta_2$ with the axis of symmetry of the cylindrically symmetrical fiber core of the multimode optical fiber 28 immediately after the beam of light enters the first fiber end 32, where modulo [$\theta_2$, 180°]≠0°.

In addition, it should be pointed out that the fiber core having a core diameter $d_{SM}$=20 μm of the monomode optical fiber 16 is imaged on an image with a diameter $d'_{SM}$=$d_{SM}$ $f_{LK1}/f_{EK}$=24 μm on the fiber core with a core diameter $d_{MM}$=100 μm of the multimode optical fiber 28 by means of the input collimator 18 with the focal distance $f_{EK}$=50 mm and by means of the first light deflecting collimator 38 with the focal distance $f_{LK1}$=60 mm. The difference between $d'_{SM}$ and $d_{MM}$ leads a mode mismatch between the mode field of the beam of light 14 to be input and the basic mode of the multimode optical fiber 28.

The beam of light 14 is directed within the multimode optical fiber 28 by means of the multimode guidance due to the type of adjustment described above and/or due to the type of input of the light described above. This means that during the propagation of the beam of light 14 through the multimode optical fiber 28, not just one mode but multiple possible modes that are possible for the wavelength λ of the beam of light 14 within the multimode optical fiber 28 are utilized and/or occupied for propagation. The beam profile 35 of the beam of light 14' on emergence of the beam of light 14' at the second fiber end 34 of the multimode optical fiber 28 differs significantly from a Gaussian distribution such as that of the beam profile 20, for example, because of the multimode guidance.

It can thus be stated that the first light deflecting unit 30 is configured and/or the monomode optical fiber 16, the fiber end 17 of the monomode optical fiber 16, the input collimator 18, the first light deflecting unit 30, the first light deflecting mirror 36, the first light deflecting collimator 38, the multimode optical fiber 28 and/or the first fiber end 32 of the multimode optical fiber 28 are arranged in relation to one another, so that in the second light conducting state the beam of light 14 entering through the input connection 22 is deflected onto the first fiber end 32 of the multimode optical fiber 28 in such a way that, on emerging from the second fiber end 34 of the multimode optical fiber 28, the beam of light 14' illuminates the fiber core of the multimode optical fiber 28 in a leveled and/or homogenized manner, almost uniformly and/or almost homogeneously. In other words, the monomode field representing the beam of light 14' on emerging from the second fiber end 34 of the multimode optical fiber 28 has a top-hat-shaped lateral intensity distribution that is leveled, homogenized, almost homogeneous and/or almost top-hat-shaped over a subsection of the outlet surface of the fiber core of the multimode optical fiber 28. The beam of light 14' itself thus also has a leveled, homogenized, almost homogeneous and/or almost top-hat-shaped beam profile 35 on emergence from the second fiber end 34 of the multimode optical fiber 28.

The beam profile 35 is shown in FIG. 2c. The lateral intensity curve I(r) of the beam of light 14' here represents a distribution as a function of the lateral distance r from the beam center r=0. The width $D_{35}$ of the distribution I(r) within which the intensity I(r) of the beam profile 35 is greater than or equal to $1/e^2$ of the maximum intensity $I_{35}$ is 80 µm, for example.

The switching device 10 also comprises a second light deflecting unit 40, configured to deflect the beam of light 14' which has beam profile 35 and is emerging from the second fiber end 34 of the multimode optical fiber 28 in the second light conducting state of the switching device 10 onto the output connection 24.

To do so, the second light deflecting unit 40 has a second light deflecting mirror 42, which is movable into or out of the beam path of the beam of light 14 entering through the input connection 22 and also has a second light deflecting collimator 44, which is configured to collimate the beam of light 14' emerging from the second fiber end 34 of the multimode optical fiber 28 in the second light conducting state and to deflect it onto the second light deflecting mirror 42 which in the second light conducting state deflects the beam of light 14' to the output connection 22.

The beam of light 14' emerging from the multimode optical fiber 28 is thus collected and collimated by the second light deflecting collimator 44. To do so, the second fiber end 34 is at the focal point and/or in the focal plane of the second light deflecting collimator 44. The second light deflecting collimator 44 has a focal distance $f_{LK2}$ of 60 mm. The collimated beam of light 14' then strikes the second light deflecting mirror 42. The second light deflecting mirror 42 comprises a planar mirror surface that is highly reflective for the wavelength λ of the beam of light and is introduced into the beam path of the beam of light 14' in the second light conducting state, such that surface normal of the mirror surface of the second light deflecting mirror 42 forms an angle of approx. 45° to the beam path of the beam of light 14', and the beam of light 14' is deflected by approx. 90°, such that it remains collimated and runs coaxially with the beam of light 14 entering through the input connection 22.

Due to the collimation of the beam of light 14', the beam profile 29 of the beam of light 14' emerging through the output connection 24 retains the leveled, homogenized, almost homogenous and/or almost top-hat-shaped form of the beam profile 35 (see FIG. 2d) but the beam diameter $D_{29}$ of the collimated beam of light 14' within which the intensity I(r) of the beam profile 29 of the collimated beam of light 14' is greater than or equal to $1/e^2$ of the maximum intensity $I_{29}$ is now approx. 9.6 mm (see FIGS. 1b and 2b).

The first and second light deflecting mirrors 36, 42 are mounted on translation stages (not shown in detail) which allow a precise linear translation movement of the first and second light deflecting mirrors 36, 42 orthogonally to the beam path of the beam of light 14 entering through the input connection 22. The translation stages fulfill the precision specifications required for the second light conducting state with regard to stability and reproducibility. First and second light deflecting mirrors 36, 42 are outside of the beam path of the beam of light 14 entering through the input connection 22 in the first light conducting state.

The optical irradiation device 10 also comprises a first optical component 46 downstream from the switching device 26 in the beam path of the beam of light 14 and/or 14' (depending on the light conducting state) and also comprises a second optical component 48 which is downstream from the first optical component 46 in the beam path of the beam of light 14 and/or 14'.

The output connection 24 is configured as a cylindrically symmetrical tube to which the first optical component 46 is flange-connected in such a way that the optical axis of the first optical component 46 runs coaxially with the axis of symmetry of the output connection 24.

The first and second optical components 46, 48 serve the purpose of focusing the beam of light 14 and/or 14' emerging from the output connection 24 onto a focus 50 and for three-dimensional guidance of the focus in space. In particular the first and second optical components 46, 48 are configured to focus the beam of light 14, 14' on any point within a scan field 52. In order to make it possible to focus the beam of light 14, 14' at any point within the scan field 52, the spatial position of the focus 50 is adjustable in three dimensions in space by means of the first and second optical components 46, 48. To this end, the first optical component 46 sets the position z of the focus 50 axially to the surface normal of the scan field 52. To do so, the first optical component 46 comprises a lens 54, which is can be displaced along the optical axis of the first optical component 46. The second optical component 48 sets the positions x and y of the focus 50 laterally to the surface normal of the scan field 52. To do so, the second optical component 48 comprises two mirrors 48a that can be rotated about an axis of rotation such that the axes of rotation are perpendicular to one another. Only one of the two mirrors 48a is shown in FIGS. 1a, 1b and 3 for a better overview. For example, the second optical component 48a is configured as a galvanometer scanner. The positions x, y and z are illustrated in FIGS. 1a, 1b and 3 on the basis of a coordinate system.

The first and second optical components 46, 48 are configured to focus the beam of light 14, 14' on any point within a planar i.e., an uncurved scan field 52. For this purpose, the design of the first optical component 46 makes it possible to omit an f-theta lens for focusing the beam of light 14, 14'. The scan field 52, for example, measures a square area of approx. 300 mm×300 mm.

The first optical component 46 is also configured to widen the beam of light 14, 14'. The widening factor amounts to 1.68, for example. The back focal length of the first optical component 46, i.e., the distance of the scan field 52 from the optical surface of the first optical component 46 that is closest to the scan field 52 along the beam path of the beam of light 14, 14', is 636 mm, for example.

In the first light conducting state, the system consisting of the input collimator 18, the first and second optical components 46, 48 sharply images the fiber end 17 of the monomode optical fiber 16 on the scan field 52. The beam profile 20 of the beam of light 14 emerging from the monomode optical fiber 16 is thus also sharply imaged on the scan field 52 by the system 18, 46, 48.

In the second light conducting state, however, the system consisting of the second light deflecting collimator 44, the second light deflecting mirror 42, the first and second optical components 46, 48 sharply images the fiber end 34 of the multimode optical fiber 28 on the scan field 52. Thus the beam profile 35 of the beam of light 14' emerging from the multimode optical fiber 28 is also sharply imaged on the scan field 52 by the system 42, 44, 46, 48.

FIG. 3 shows a system 100 for producing work pieces by irradiation of powder layers of a powdered raw material with laser radiation. The optical irradiation device 10 is connected to the system 100 in such a way that the beam of light 14 and or 14' supplied by the optical irradiation device 10 (depending on the light conducting state) is supplied through a window 110 of a powder chamber 120. The system 100 comprises a carrier 130 inside the powder chamber 120 to which powder layers 140 of the raw material powder can be applied. The optical irradiation device 10 is configured and arranged to irradiate a powder layer 140 applied to the carrier 130 with the focus 50 of the beam of light 14 or 14' in order to produce a three-dimensional work piece from the powdered raw material by a generative layer buildup method.

The optical irradiation device 10 may comprise an input unit (not shown in detail), which is configured to detect data representative of the work piece to be produced (e.g., CAD data). Furthermore, the optical irradiation device 10 may comprise a control unit (also not shown in detail) which is connected to the input unit and is configured to switch the switching device 26 between the first light conducting state and the second light conducting state depending on of the data representative of the work piece to be produced and detected by the input unit.

The beam profile 20 shown in FIG. 2a is suitable for a detail-rich and accurate processing (exposure or irradiation) in the outer contours, i.e., in the jacket area of the powder layer. However, the beam profile 35 shown in FIG. 2c is suitable for extensive processing (exposure or irradiation) in the core area of the powder layer.

The switching device 26 is thus in the first light conducting state (see FIG. 1a) when the outer contours, i.e., the jacket area of the work piece to be fabricated is/are created. However, the switching device 26 is in the second light conducting state (see FIG. 1b) when extensive exposure occurs in the core area of the powder layer.

To prevent thermal, mechanical and/or acoustic influences on the functioning of the switching device 26, the switching device 26 may be encapsulated with the help of a housing 45 shown with dotted lines in FIGS. 1a, 1b and 3. The housing 45 is thermally, mechanically and/or acoustically insulated from the environment. Furthermore, the temperature inside the housing 45 can be kept stable by suitable means.

The input connection 22 and the output connection 24 are fixedly connected to the housing 45 of the switching device 26, for example, by bolting them to one another. Unless mentioned explicitly to the contrary, the same reference numerals in the figures stand for the same elements or those having the same effect. Moreover, any combination of the features illustrated in the figures is conceivable.

What is claimed is:

1. An optical irradiation device for a system for producing work pieces by irradiation of powder layers of a powdered raw material using laser radiation, comprising:
    a multimode optical fiber suitable for a central wavelength of a beam of light for multimode guidance having a first beam profile and entering through an input connection, the multimode optical fiber having a cut-off wavelength that is greater than the central wavelength of the beam of light; and
    a switching device which is selectively switchable between a first light conducting state and a second light conducting state, wherein the switching device is configured to conduct the beam of light having a first beam profile and entering through the input connection in the first light conducting state to an output connection, such that the beam of light has the first beam profile on emerging from the output connection, and to conduct the beam of light having the first beam profile and entering through the input connection in the second light conducting state to the output connection by means of selective redirection of the beam of light through the multimode optical fiber such that the beam of light has a second beam profile which is different from the first beam profile on emerging from the output connection by the multimode guidance in the multimode optical fiber,
    wherein a characteristic width of the first beam profile in a lateral intensity distribution of the first beam profile is narrower than a characteristic width of the second beam profile in a lateral intensity distribution of the second beam profile.

2. The optical irradiation device according to claim 1, wherein the switching device comprises a first light deflecting unit which is configured to deflect the beam of light having a first beam profile entering through the input connection in the second light conducting state of the switching device onto a first fiber end of the multimode optical fiber such that the beam of light has the second beam profile on emerging from a second fiber end of the multimode optical fiber, and the switching device further comprises a second light deflecting unit which is configured to deflect the beam of light having the second beam profile emerging from the second fiber end of the multimode optical fiber in the second light conducting state of the switching device to the output connection.

3. The optical irradiation device according to claim 2, wherein the first light deflecting unit of the switching device comprises a first light deflecting mirror which is movable into or out of a beam path of the beam of light entering through the input connection and comprises a first light deflecting collimator which is configured to focus the beam of light deflected by the first light deflecting mirror in the second light conducting state onto the first fiber end of the multimode optical fiber, and the second light deflecting unit of the switching device comprises a second light deflecting mirror that is movable into or out of the beam path of the beam of light entering through the input connection, and comprises a second light deflecting collimator which is configured to collimate the beam of light emerging from the second fiber end of the multimode optical fiber in the second light conducting state and to deflect it onto the second light deflecting mirror which deflects the beam of light to the output connection in the second light conducting state.

4. The optical irradiation device according to claim 1, further comprising:
    a laser for generating a beam of light having a central wavelength;
    a monomode optical fiber suitable for monomode guidance for the central wavelength of the beam of light; and
    an input collimator which is configured to collimate the beam of light emerging from the monomode optical fiber and to guide it through the input connection.

5. The optical irradiation device according to claim 4, wherein the laser is configured to generate the beam of light with a central wavelength which is longer than a cutoff wavelength of the monomode optical fiber required for the monomode guidance and is shorter than a cutoff wavelength of the multimode optical fiber required for the monomode guidance.

6. The optical irradiation device according to claim 4, wherein a fiber end of the monomode optical fiber, the input collimator, the first light deflecting unit and the first fiber end of the multimode optical fiber are arranged in relation to one another so that the beam of light has a leveled, homogenized, almost homogeneous and/or almost top-hat-shaped second beam profile on emerging from the second fiber end of the multimode optical fiber.

7. The optical irradiation device according to claim 4, further comprising optical components for focusing the beam of light emerging from the output connection onto a focus and for three-dimensional guidance of the focus in space.

8. A system for producing work pieces by irradiating powder layers of a powdered raw material with laser radiation, comprising:
   a carrier onto which powder layers of the powdered raw material can be applied; and
   an optical irradiation device according to claim 1, wherein the optical irradiation device is configured and arranged to irradiate a powder layer applied to the carrier using the laser light to produce a three-dimensional work piece from the powdered raw material by using a generative layer buildup method.

9. An optical irradiation device for a system for producing work pieces by irradiation of powder layers of a powdered raw material using laser radiation, comprising:
   a laser for generating a beam of light having a central wavelength;
   a monomode optical fiber suitable for monomode guidance for the central wavelength of the beam of light;
   an input collimator which is configured to collimate the beam of light emerging from the monomode optical fiber and to guide it through an input connection;
   a multimode optical fiber suitable for the central wavelength of the beam of light for multimode guidance having a first beam profile and entering through the input connection; and
   a switching device which is selectively switchable between a first light conducting state and a second light conducting state, wherein the switching device is configured to conduct the beam of light entering through the input connection in the first light conducting state to an output connection, such that the beam of light has a first beam profile on emerging from the output connection and to conduct the beam of light entering through the input connection in the second light conducting state to the output connection by means of the multimode optical fiber such that the beam of light has a second beam profile which is different from the first beam profile on emerging from the output connection by means of the multimode guidance in the multimode optical fiber,
   wherein a characteristic width of the first beam profile in a lateral intensity distribution of the first beam profile is narrower than a characteristic width of the second beam profile in a lateral intensity distribution of the second beam profile.

* * * * *

UNITED STATES PATENT AND TRADEMARK OFFICE
CERTIFICATE OF CORRECTION

PATENT NO. : 9,527,246 B2
APPLICATION NO. : 13/684601
DATED : December 27, 2016
INVENTOR(S) : Andreas Wiesner et al.

Page 1 of 1

It is certified that error appears in the above-identified patent and that said Letters Patent is hereby corrected as shown below:

On the Title Page

Assignee should be listed as:
(73) Assignee: SLM SOLUTIONS GROUP AG, Luebeck (DE)

Signed and Sealed this
Ninth Day of May, 2017

Michelle K. Lee
*Director of the United States Patent and Trademark Office*